United States Patent [19]
Maxey

[11] Patent Number: 5,249,033
[45] Date of Patent: Sep. 28, 1993

[54] AUTOMATED INTERFEROMETRIC ALIGNMENT SYSTEM FOR PARABOLOIDAL MIRRORS

[75] Inventor: L. Curtis Maxey, Powell, Tenn.

[73] Assignee: Martin Marietta Energy Systems, Inc., Oak Ridge, Tenn.

[21] Appl. No.: 799,591

[22] Filed: Nov. 27, 1991

[51] Int. Cl.⁵ .............................................. G01B 11/26
[52] U.S. Cl. ................................... 356/363; 356/352; 356/361; 356/138
[58] Field of Search ............... 356/363, 352, 138, 153, 356/361

[56] References Cited

U.S. PATENT DOCUMENTS 3,844,660 10/1974 Hunter ................................ 356/106
4,472,054 9/1984 Pouit ................................... 356/363

OTHER PUBLICATIONS

C. Bond and C. A. Pipan, "How to Align an Off-Axis Parabolic Mirror," Proceedings of the SPIE, vol. 1113, 236-248 (1989).

Primary Examiner—Samuel A. Turner
Assistant Examiner—LaCharles P. Keesee
Attorney, Agent, or Firm—J. M. Spicer; H. W. Adams

[57] ABSTRACT

A method is described for a systematic method of interpreting interference fringes obtained by using a corner cube retroreflector as an alignment aid when aigning a paraboloid to a spherical wavefront. This is applicable to any general case where such alignment is required, but is specifically applicable in the case of aligning an autocollimating test using a diverging beam wavefront. In addition, the method provides information which can be systematically interpreted such that independent information about pitch, yaw and focus errors can be obtained. Thus, the system lends itself readily to automation. Finally, although the method is developed specifically for paraboloids, it can be seen to be applicable to a variety of other aspheric optics when applied in combination with a wavefront corrector that produces a wavefront which, when reflected from the correctly aligned aspheric surface will produce a collimated wavefront like that obtained from the paraboloid when it is correctly aligned to a spherical wavefront.

7 Claims, 14 Drawing Sheets

AUTOMATED INTERFEROMETRIC ALIGNMENT SYSTEM FOR PARABOLOIDAL MIRRORS

This invention was made with Government support under contract no. DE-AC05-84OR21400 awarded by the Department of Energy. The Government has certain rights in this invention.

BACKGROUND OF THE INVENTION

1. Field of the Invention

The invention relates to aligning a paraboloidal off-axis mirror segment to a point source, and more particularly to improvements in the alignment procedure for an autocollimating test that uses a diverging beam (spherical wavefront) interferometer.

2. Description of the Prior Art

Perhaps the most frequently encountered aspheric optical surfaces are paraboloids or paraboloid segments. Their properties make them useful in a variety of telescopes and optical instruments.

The task of aligning any mirror surface interferometrically, whether for interferometric testing or for optical alignment within a larger system, requires some practice. For flat or spherical mirrors, the requisite level of skill is easily acquired by most competent technical professionals in a matter of minutes. For anyone dealing with aspheres, however, interferometric alignment can be quite challenging. All the alignment errors must be eliminated before the figure quality of the optic can be determined.

When off-axis paraboloidal OAP mirror segments and many other aspheric optics are interferometrically aligned, the configuration is usually in some form of null test. For paraboloids, the null test is often referred to as the autocollimating test. For paraboloids, two autocollimating tests exist. One uses an interferometer with a collimated (planar wavefront) beam in combination with a spherical reference surface; the other uses an interferometer with a diverging (spherical wavefront) beam in combination with a planar reference surface.

The invention improves the alignment of a paraboloid to a point in space, as required in the latter diverging beam type of autocollimating test. This is actually the more difficult of the two tests, but is often preferred for many applications for economic reasons and also because it can be used to test OAP segments of virtually any size.

The conventional diverging beam autocollimating test uses an interferometer, the off-axis parabolic segment and a reference flat. The diverging beam from the interferometer or lens is a spherical wavefront, and is precisely aligned such that the center of emerging wavefront is exactly coincident in space with the focal point of the paraboloid. The wavefront reflected from the parabolic segment is therefore collimated, a planar wavefront, and the reference flat is precisely aligned such that it is parallel to this wavefront (normal to the collimated beam).

The difficulty in achieving the precise alignment of these components occurs because the interferometer, OAP segment, and flat must be aligned as a system in prior technique. The most critical and demanding alignment is that of the paraboloid to the interferometer. Movement of the paraboloid relative to the interferometer, however, affects the entire system alignment. Thus, until the system is realigned by adjusting the reference flat, the effect of moving the paraboloid cannot be interpreted. The concurrent alignment of the two optical surfaces (paraboloid and reference surface) requires a high level of skill. A competent technical professional can expect to spend many hours to many days developing this level of skill. The level of success achieved is heavily dependent upon the individual's capabilities in the areas of geometry, spatial relations, and logic. Once skilled in the alignment process, the first time alignment of any "new" paraboloid or parabolic segment may still require several hours.

OBJECTS OF THE INVENTION

Accordingly, it is an object of the invention to simplify the noninterferometric alignment of paraboloids within optical systems.

Another object is to simplify the interferometric alignment of paraboloids within optical systems.

Another object is to simplify the alignment of the diverging beam autocollimating test for interferometrically aligned paraboloids.

A further object is to provide a means for automating the interferometer alignment of the paraboloid to a point in space for the diverging beam autocollimating test for paraboloids.

A still further object is to provide a manual means for aligning the diverging beam autocollimating test for paraboloids that requires no knowledge of the focal length of the parent paraboloid or the off-axis distance.

SUMMARY OF THE INVENTION

The alignment method employed in this invention initially replaces the conventional reference flat with a cube corner retroreflector in the testing or alignment of paraboloidal segments. The cube corner decouples the alignment of the off-axis paraboloidal (OAP) mirror segment from the reference flat. The OAP segment is initially aligned to the interferometer using the optical feedback provided by the cube corner. The alignment process consists of a systematic method of interpreting the interferometric fringes produced in the retroreflector image. This interpretation is used to adjust the pitch, yaw and distance (focus) of the OAP segment relative to the interferometer resulting in a correctly aligned off-axis paraboloidal mirror segment.

DETAILED DESCRIPTION OF THE INVENTION

Interferometric Method

When aligning an OAP segment for purposes of an autocollimating test, the optic being tested should be mounted according to standard practice with precision adjustments for tip (pitch), tilt (yaw), and focus (translation parallel to the optical axis of the parent paraboloid) relative to the interferometer. In the description which follows, the OAP segment is mounted such that the imaginary line passing from the vertex of the parent paraboloid through the center of the OAP segment is parallel to the optical table. Rotation about this axis is described herein as pitch (or tip). This method of mounting the segment has the practical effect of minimizing the interaction between the tip and tilt adjustments. It also permits the interferometer, test optic, and reference surface to be set to one height initially, with all subsequent positioning to be made in the plane of the optical bench.

If there are no fiducials to indicate the relationship of the segment to the vertex of the parent paraboloid, methods for establishing this relationship may be found in C. Bond and C. A. Pipan's publication "How to Align an Off-axis Parabolic Mirror," published in Proceedings of the SPIE, Vol 1113, 236-248 (1989). Interaction between tilt and focus adjustments can be minimized by ensuring that the focus adjustment is parallel to the collimated beam reflected from the test optic. The description which follows assumes the above described frame of reference.

Figure 1:
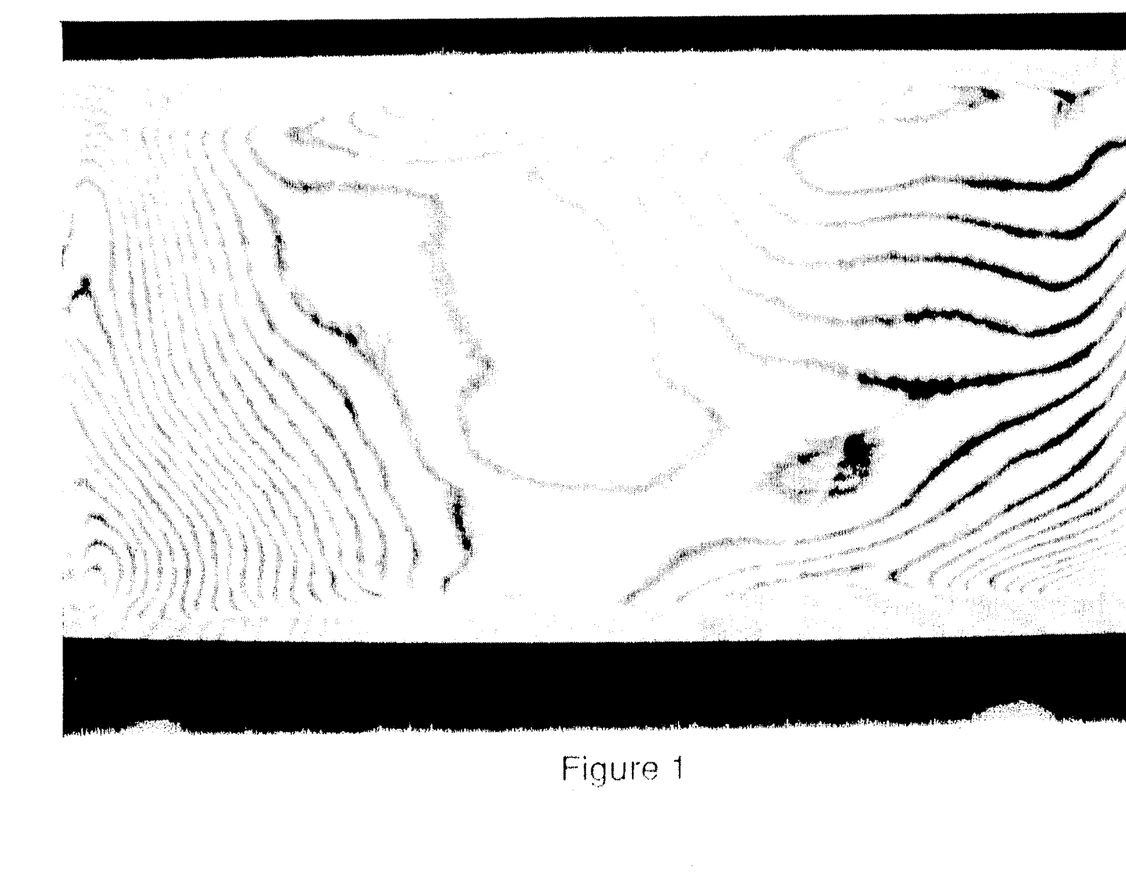
FIG. 1 is a photograph of an interferogram of a partially aligned autocollimating test showing combined figure and alignment errors.

FIG. 1 shows the interferogram of an OAP segment that has been partially aligned using the conventional iterative process for aligning to a diverging beam. Significant time was invested to achieve this degree of alignment. The summation of alignment errors and figure errors in this interferogram make it extremely complex. From the FIG. 1 interferogram it is difficult to determine what adjustment to the test optic will improve the alignment. This example well illustrates the need for an improved alignment technique.

To illustrate the power of the alignment method of this invention, assume as a worst-case scenario that no prior alignment efforts have been attempted and further that the focal length and off-axis angle of the optic are unknown. To simulate this situation, the partially aligned autocollimating test shown in FIG. 1 was deliberately and arbitrarily misaligned by introducing severe tip and tilt, and by displacing the optic several centimeters on the optical bench.

Figure 2:
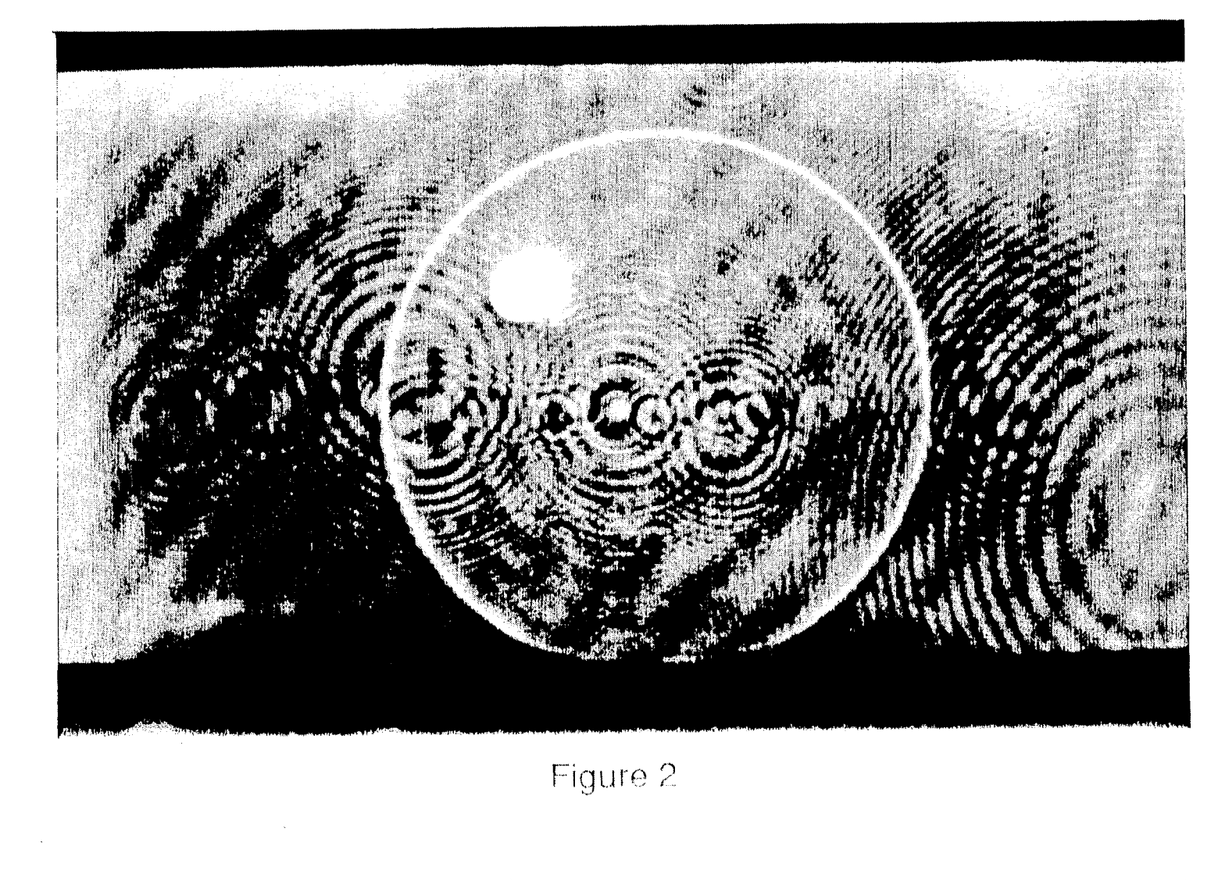
FIG. 2 is a photograph of an aberrated image of a cube corner retroreflector produced by a severely misaligned autocollimating test configuration with the reference flat replaced by a cube corner retroreflector.

With a completely misaligned optic, the alignment process is begun. The test optic is illuminated by the diverging beam from the interferometer, and the cube corner retroreflector is placed in the path of the light reflected from the surface of the optic. At once, an out-of-focus and distorted image of the cube corner can be seen in the imaging system of the interferometer (FIG. 2).

Figure 3:
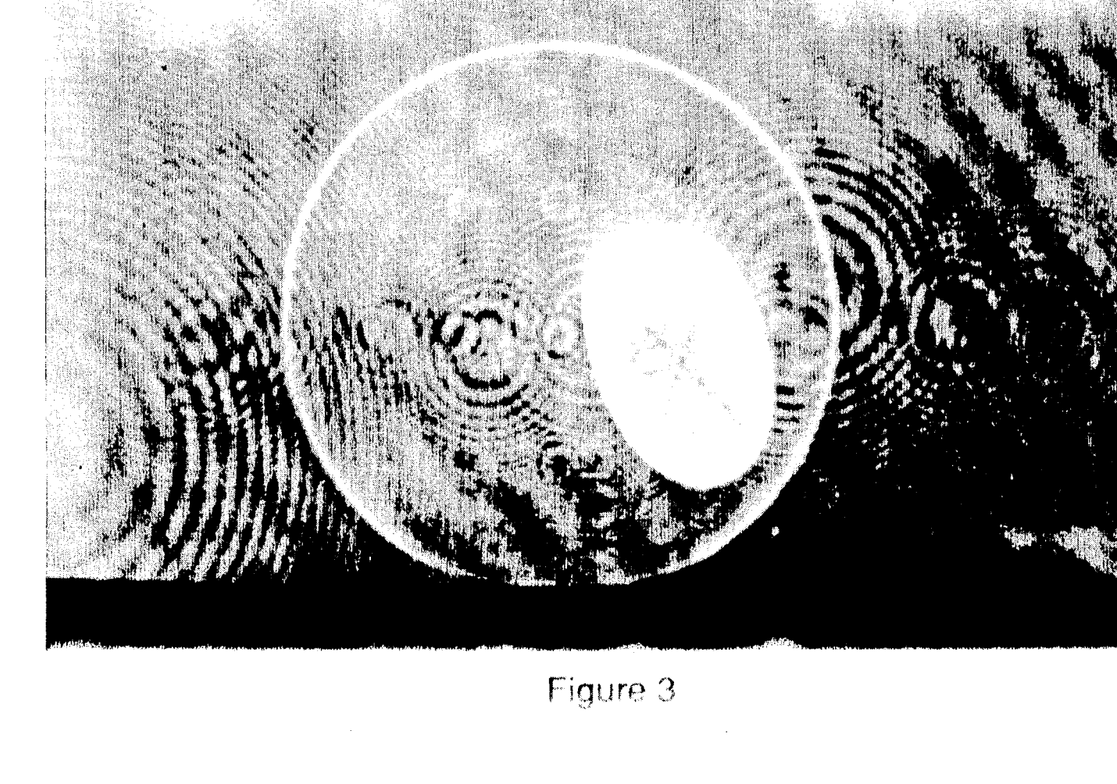
FIG. 3 is a photograph of an image of the cube corner after improving the focus adjustment and illustrating image elongation and rotation due to residual alignment errors.

Initial alignment is achieved by very coarse adjustments of the position of the test optic on the optical bench. The objective in the initial alignment is to obtain an unaberrated image of the cube corner. As focus is adjusted, an improved but still distorted cube corner image can be observed (FIG. 3). The initial cube corner images for a misaligned system will typically be elongated and rotated (i.e., the image is not radially symmetric and is not symmetric about the pitch axis). Pitch (tip) adjustments will eliminate the rotation of the image, and yaw (tilt) adjustments will eliminate the elongation. Focus is adjusted to obtain the best focus of the retroreflector image.

Figure 4:
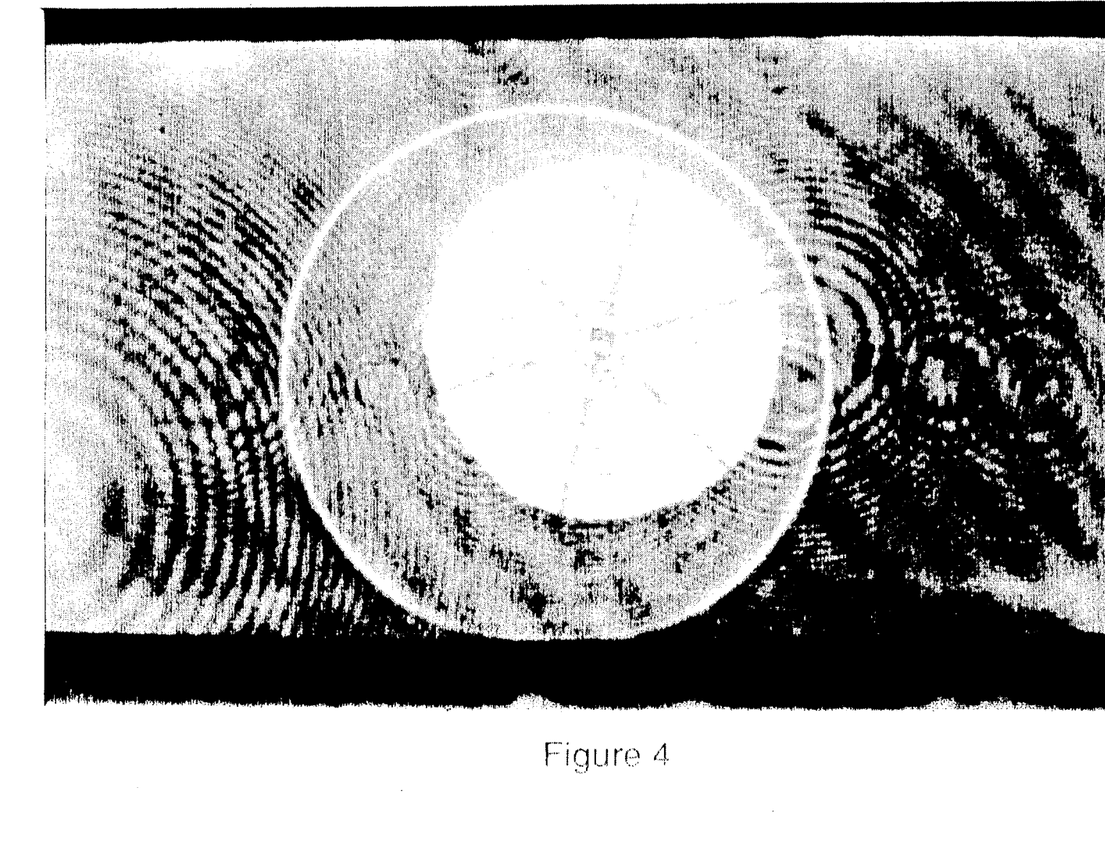
FIG. 4 is a photograph of an unaberrated cube corner image obtained after adjusting the tip (pitch), tilt (yaw), and focus (translation parallel to the optical axis of the paraboloidal surface) to obtain interference fringes.

As coarse adjustment of focus, tip, and tilt are completed, the cube corner image becomes radially symmetric with clear definition of the six radial lines in the image (FIG. 4). When the unaberrated image of the cube corner has been obtained, circular interference fringes will be present at the intersection of the six radial lines. Any displacement of the fringes from this intersection point indicates an internal misalignment in the interferometer that should be corrected before continuing.

Once circular fringes are obtained in the image of the cube corner, they are interpreted to complete the alignment process. Initially, the focus is adjusted to decrease the density of the interference fringes until they are observed to be somewhat elongated as in FIG. 5. The elongated fringes will almost certainly be rotated (asymmetric) with respect to the pitch axis when this condition is first achieved.

Figure 6:
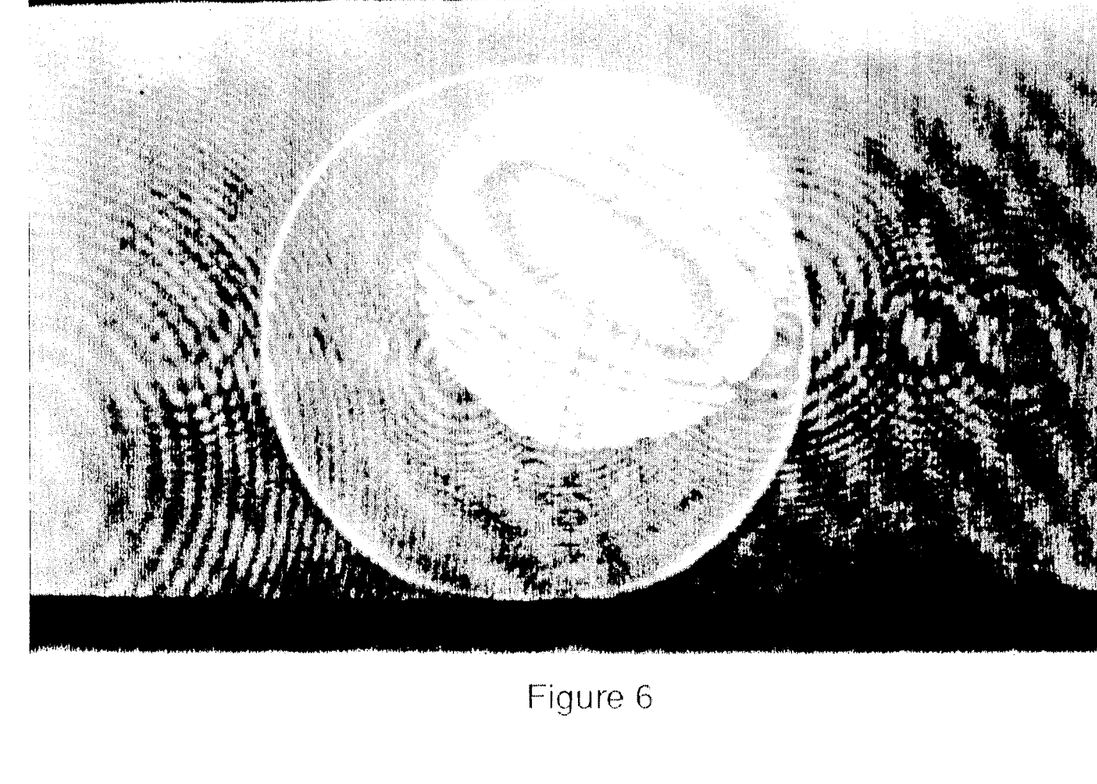
FIG. 6 is a photograph of the cube corner interferogram after substantial focus correction—note elongation and rotation of the interference fringes.

FIG. 6 shows the appearance of the fringes after further focus adjustment. Note that the rotation and elongation of the fringes are now quite obvious. During all subsequent alignment, adjusting the tip of the test optic will remove the pitch axis asymmetry in the elongated fringes, while adjusting the tilt of the test optic will reduce the radial asymmetry.

Figure 7:
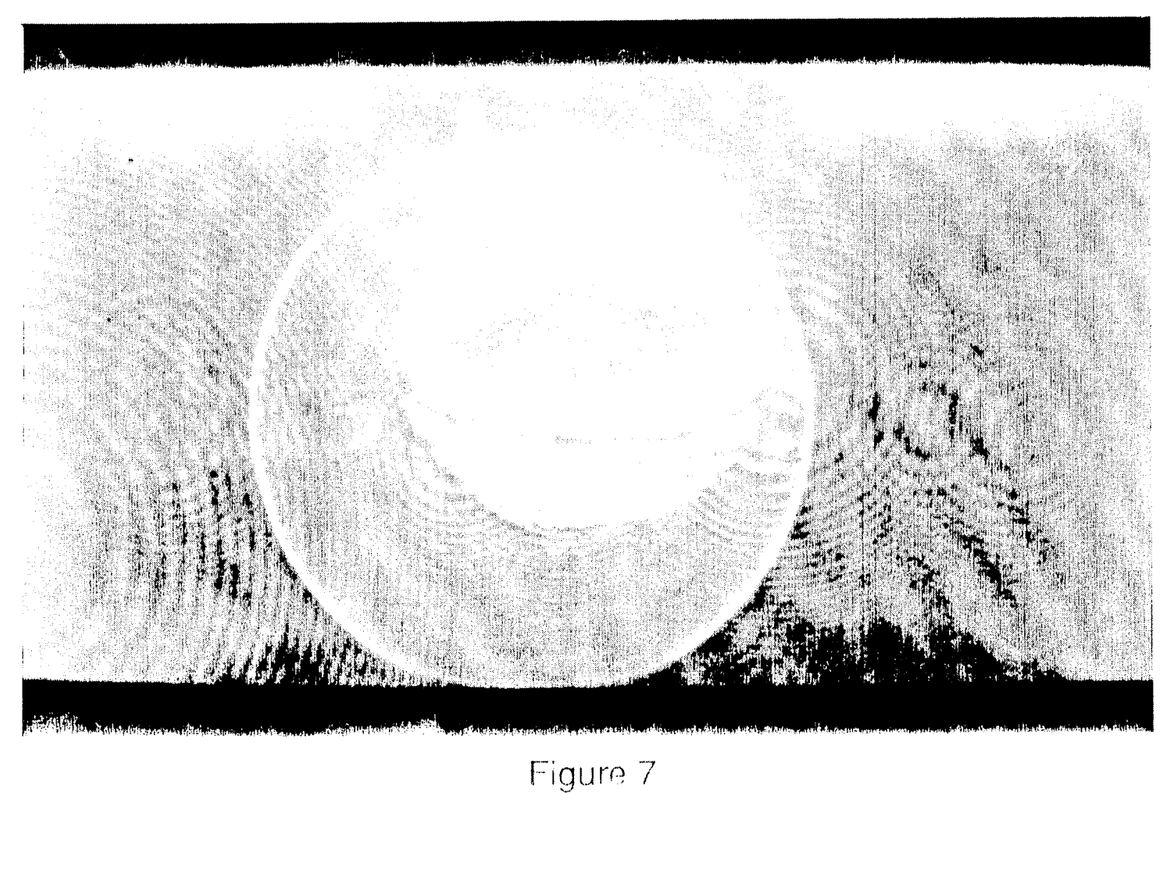
FIG. 7 is a photograph of the cube corner interferogram after adjusting tip to eliminate rotation.
Figure 8:
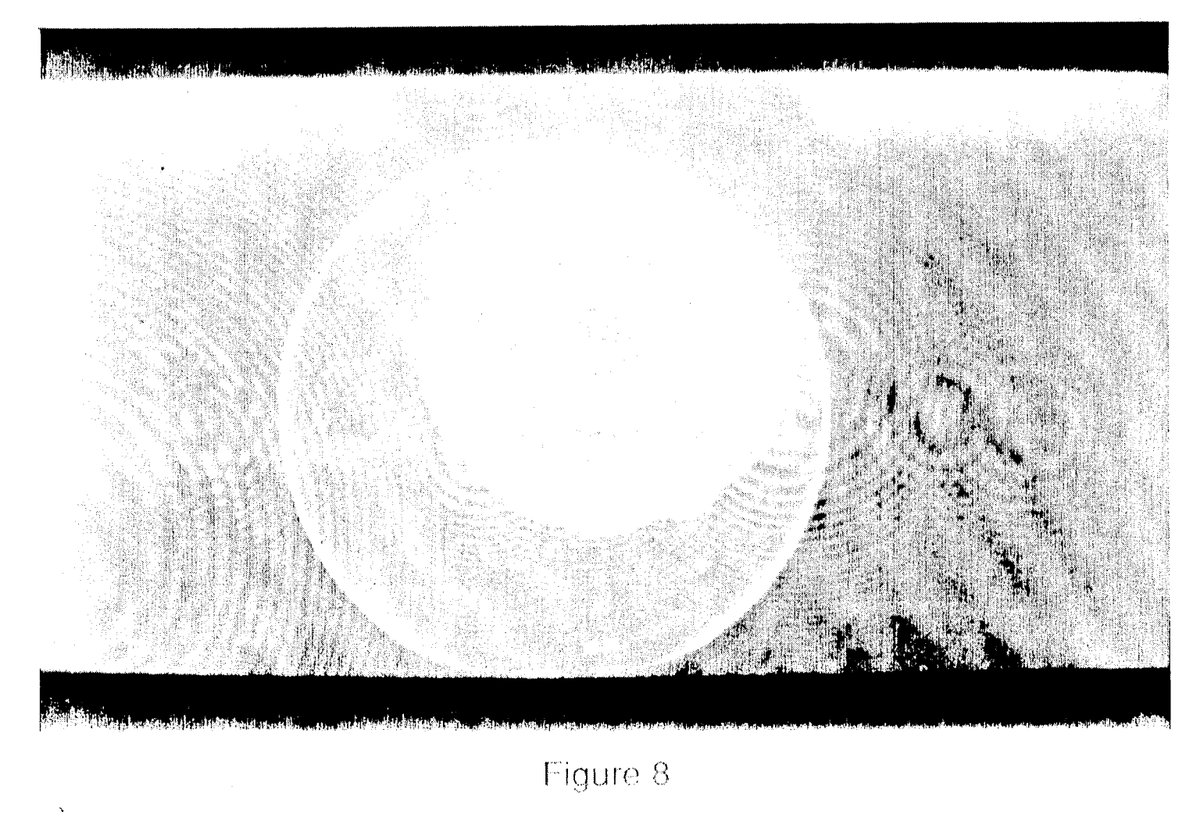
FIG. 8 is a photograph of the cube corner interferogram after adjusting tilt to eliminate elongation.
Figure 9:
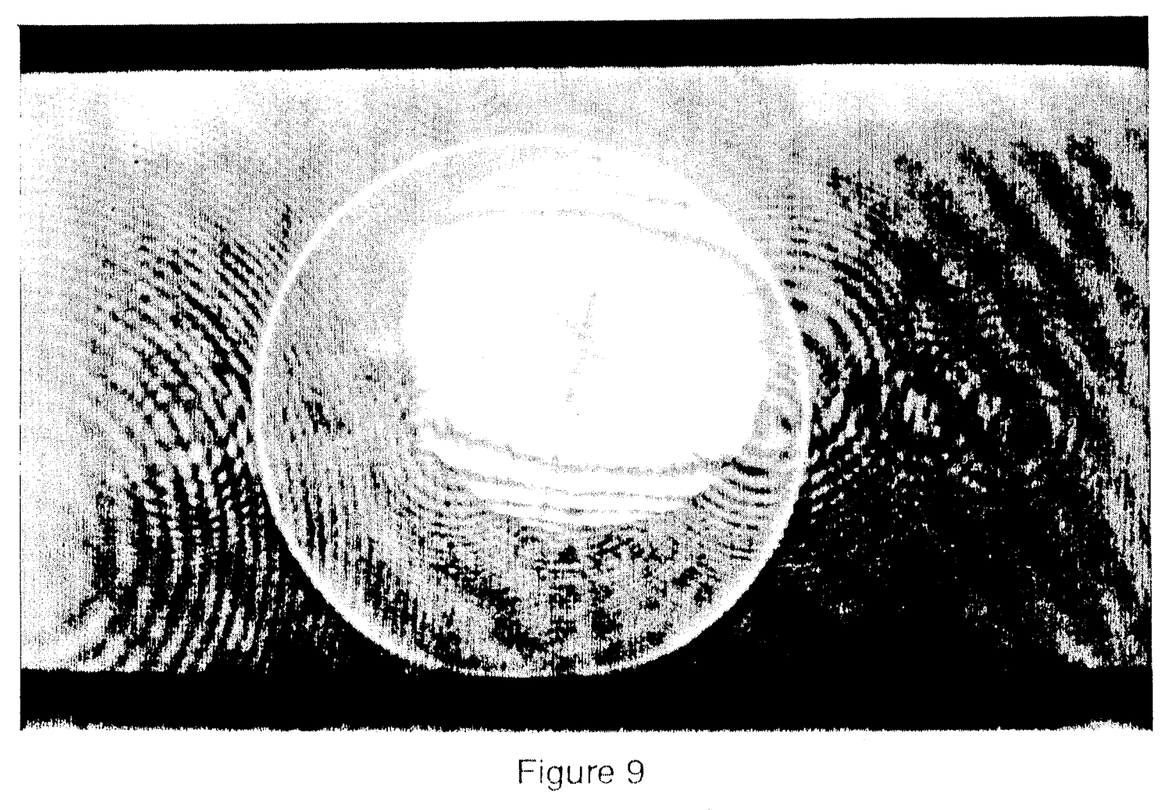
FIG. 9 is a photograph of the cube corner interferogram after further focus correction.

In FIG. 7, tip has been adjusted to remove the rotation from the elongated fringes. In FIG. 8, tilt adjustment has reduced the elongation of the fringes. Focus is now adjusted to further reduce the number of fringes. As the number of fringes is reduced, elongation and rotation appear again (FIG. 9).

Figure 10:
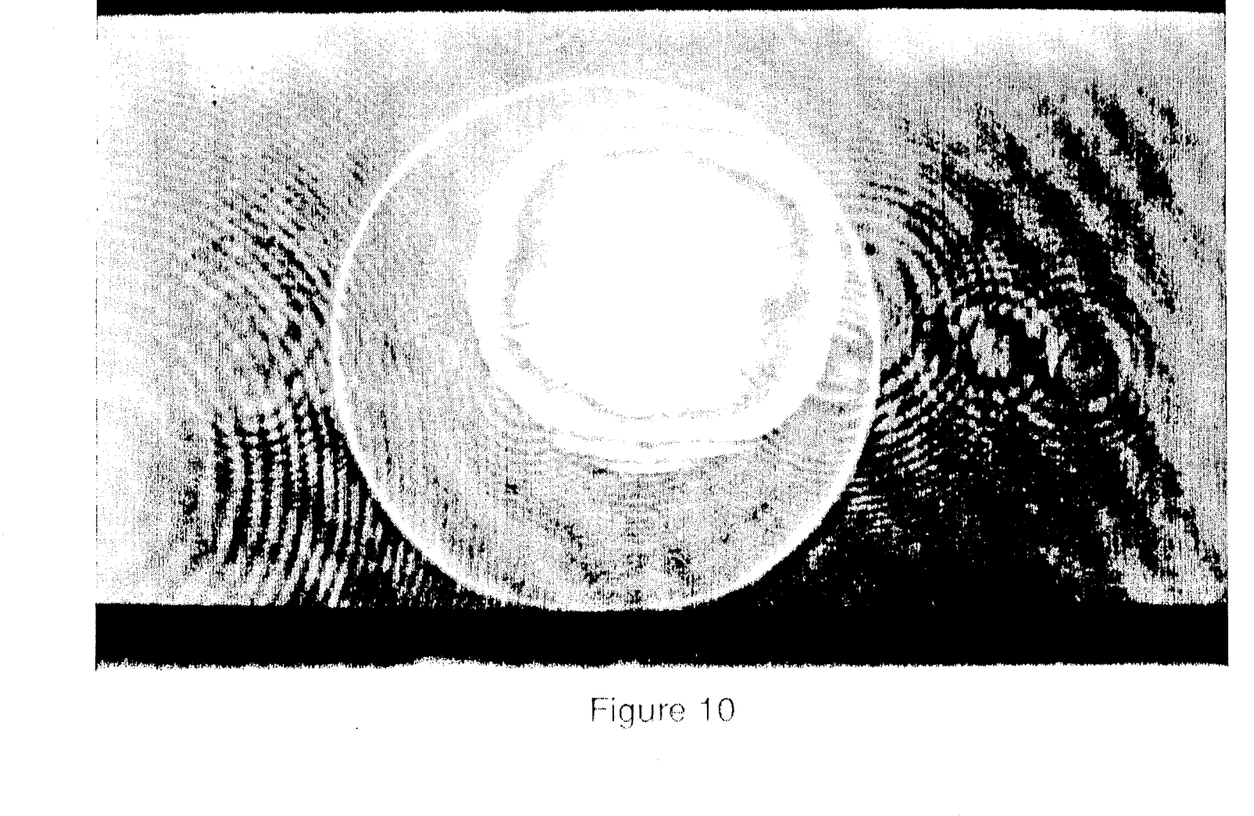
FIG. 10 is a photograph of the interferogram showing a single focus fringe that has been optimized to eliminate all remaining rotation and elongation.
Figure 11:
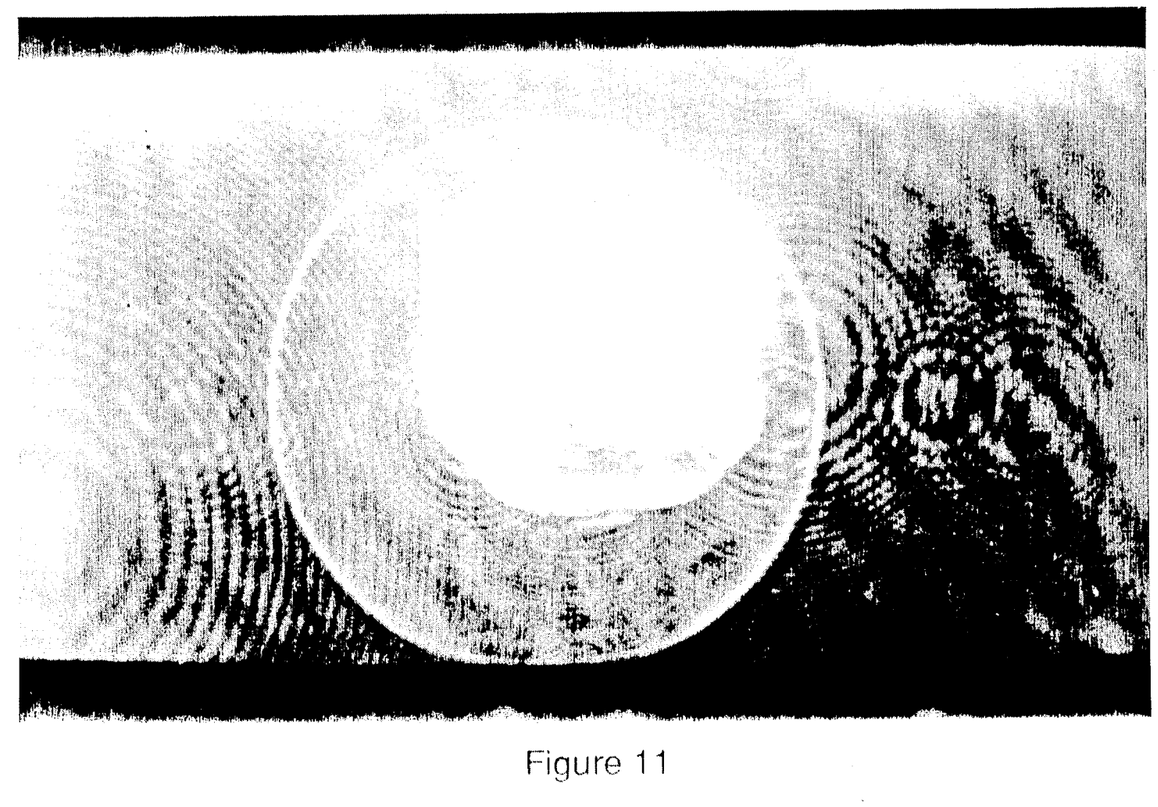
FIG. 11 is a photograph of the final cube corner interferogram optimized to obtain the best approximation to a single uniform fringe across the entire image.

After adjusting tip and tilt, a single round fringe is observed in the cube corner image of FIG. 10. A trace of focus error is maintained to the last step so that tip and tilt can be adjusted to eliminate any remaining rotation or elongation from the last circular fringe. A final focus adjustment removes the remaining circular interference fringe. Tip and tilt are then adjusted to obtain the best approximation to a single uniform interference fringe which is symmetric about the pitch axis (FIG. 11).

Figure 12:
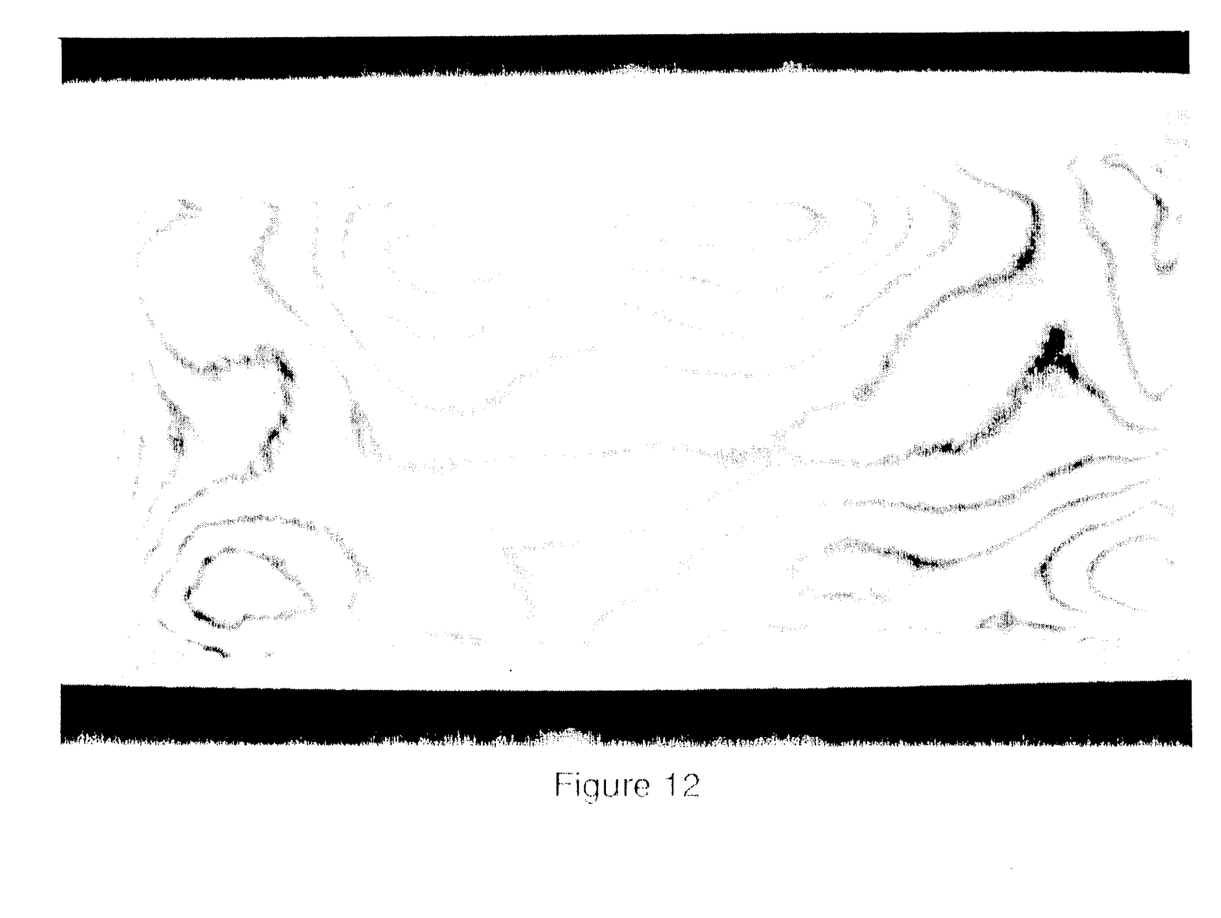
FIG. 12 is a photograph of the interferogram of well aligned autocollimating test, obtained by aligning the reference flat in place of the cube corner retroreflector.

With no further adjustments to the test optic, the cube corner retroreflector is removed and the reference flat is inserted in the system and aligned to achieve the minimum fringe density. The result is an autocollimating test with essentially uniform fringe density across the image of the test optic as shown in FIG. 12. If the OAP segment is larger than the retroreflector, it is understood that the alignment is optimized over the portion of the paraboloid that was evaluated in the cube corner. Minor additional adjustments may reduce the peak-to-valley error evaluated over the entire OAP segment under test. If the alignment was not for an autocollimating test, but was to align an OAP segment to a specific point in an optical sytem, this last step of inserting the reference flat may be ignored.

From the above description, it will be understood that a primary feature of this invention is the incorporation of the cube corner to provide real time feedback of the alignment of the OAP mirror segment to the interferometer. The prior diverging beam method relied upon making incremental adjustments to the OAP mirror segment and readjusting the reference flat to evaluate the effect of the adjustment.

Results

As with other interferometric interpretations, the ability to interpret and correct the paraboloid alignment based on the cube corner interferogram improves with experience. When testing OAP segments that are smaller than the cube corner, astonishing results have been obtained after gaining familiarity with the technique. After carefully executing the cube corner alignment technique and aligning the reference flat—to obtain autocollimation, the alignment of the paraboloid to the interferometer could not be measurably improved with further adjustment (i.e., the peak-to-valley figure error could not be further reduced).

Despite the fact that this technique is optimized for optics smaller than the cube corner retroreflector, it is still useful as a preliminary alignment technique for autocollimating tests of larger paraboloids by aligning a subaperture portion of the optic using a smaller cube corner retroreflector. Using multiple cube corners or a lateral transfer retroreflector may improve the results obtained with large-aperture optics.

As an alignment aid for an autocollimating test, the invention reduces the alignment challenge to a level such that a competent technical professional can be trained to the requisite skill level in about an hour. This is made possible by the invention providing for independent identification and correction of pitch, yaw, and focus errors. The optical feedback is such that simple image processing can easily be implemented for alignment interpretation. The simplicity of the technique has also made it possible to quickly train individuals unfamiliar with optical testing to perform all but the very final alignment of an autocollimating test.

The wide dynamic range of this alignment technique makes it applicable to a variety of alignment tasks involving paraboloidal mirrors.

The invention has demonstrated that use of a corner cube retroreflector permits the alignment to be quickly established without prior knowledge of the focal length and off-axis distance and using the standard interferometer imaging system at all stages. By contrast, the prior diverging beam method requires initial mechanical alignment based on the knowledge of focal length and off-axis distance, subsequent optical alignment using the shape of the spot produced by focusing the return beam, and final alignment based upon the interference fringes produced in the interferometer imaging system.

Noninterferometric Method

Although the invention has been described with respect to the alignment of autocollimating tests for figure metrology of paraboloidal mirrors and mirror segments, many alignment tasks involving paraboloids require only moderate alignment accuracy. Such tasks include the alignment of paraboloidal mirrors for collimation purposes where significant wavefront aberrations can be tolerated. The dynamic range of this alignment technique is such that the noninterferometric portion of the technique can provide sufficient alignment accuracy. This corresponds to the method steps given for FIGS. 1 through 4.

To achieve this level of alignment accuracy, an interferometer is not required. If a point source can be located at the position where the focus of the paraboloid needs to be located, the noninterferometric alignment technique can be carried out. The point source is readily obtained, for example, by a beam of light from a source and a lens. By placing a beam splitter at any point in the path of the light that has been reflected from the retroreflector into the segment, a portion of the light can be diverted into an imaging system producing an image of the retroreflector which is aberrated due to alignment errors in the paraboloid. The alignment of the paraboloid can then be adjusted to obtain the best unaberrated image of the cube corner, thus eliminating the major alignment errors.

PREFERRED EMBODIMENT

Figure 13:
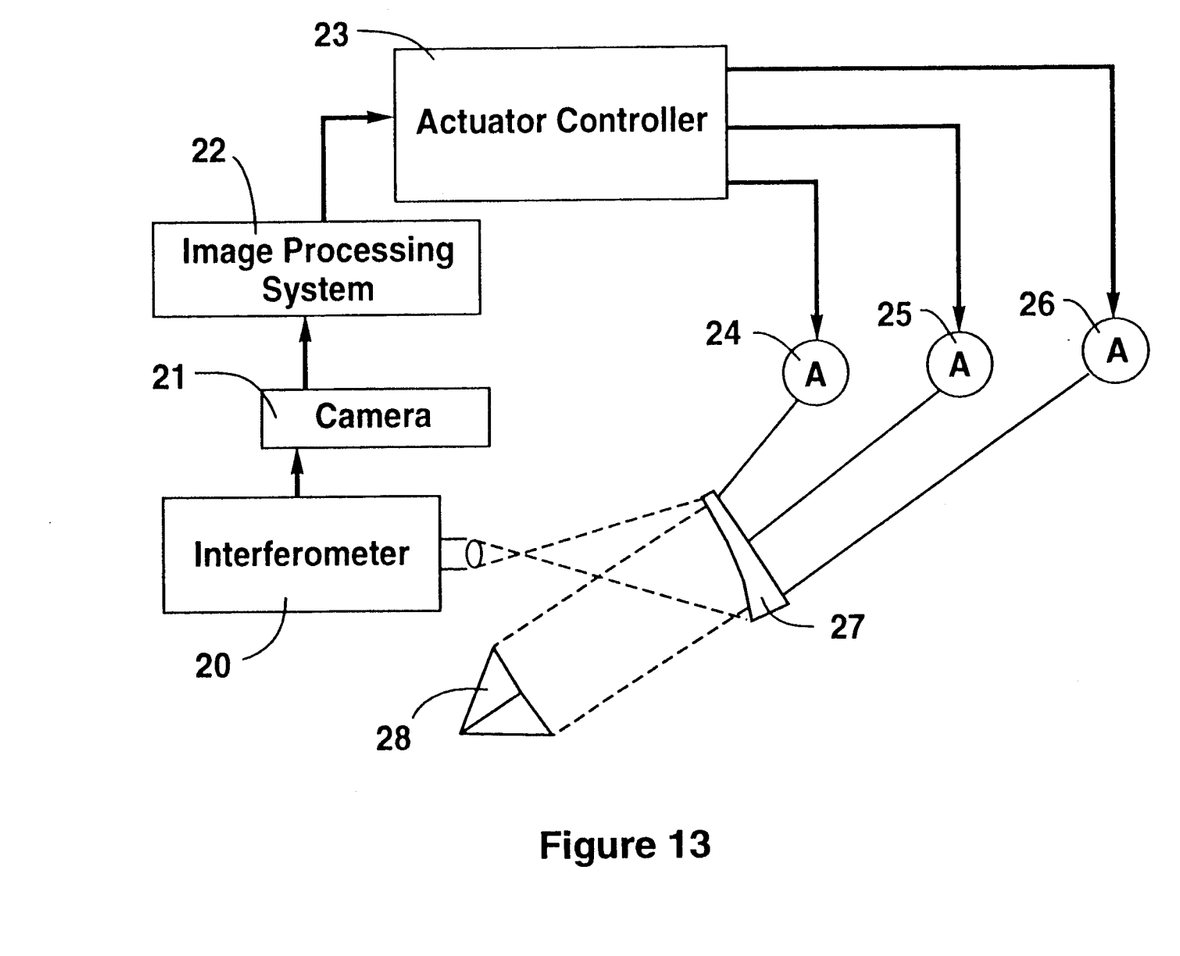
FIG. 13 is a schematic block diagram of an automated alignment system according to the present invention.

The interferometric alignment previously described is automated by incorporating a feedback loop to automatically interpret the concentric fringe patterns and provide adjustment signals to actuators (FIG. 13). Because the interpretation is based upon relatively simple interpretation of the interference pattern shape, orientation, and density, the software and hardware for interpreting the alignment information in the cube corner image are not highly sophisticated.

In FIG. 13, a machine rather than the operator performs the alignment process. Where the operator would normally make certain judgements about the image seen on the imaging system (or interferometer monitor), a computer within an image processing system makes those judgements and generates appropriate positioning commands.

In FIG. 13, the system includes an interferometer 20 whose output goes to a camera 21. An image processing system 22 acquires an image from the camera 21 and digitizes it for subsequent interpretation by a digital computer within the image processing system 22. The output of the image processing system 22 is a command that goes to an actuator controller 23. The actuator controller 23 has three outputs going to independent actuators 24, 25, and 26 that are mounted to control the pitch, yaw, and focus adjustments, respectively, of the paraboloid 27 to be automatically aligned.

The image formed in the interferometer 20 and processed by the image processing system 22 is a direct result of having the cube corner retroreflector 28 present in the light reflected off of the paraboloidal segment 27. The light originates in the interferometer source, reflects from the segment 27 to the retroreflector 28, returns to the segment 27, and reflects back into the interferometer to form the retroreflector image. As previously described, the segment 27 has been positioned at the correct height with respect to the interferometer 20. The paraboloidal segment 27 is initially aligned to good mechanical tolerances, defined as alignment good enough that interference fringes are present in the cube corner image (see FIG. 4). With these interference fringes present, the automatic process can begin.

It is understood that the direction of adjustment has to be known or determined. The image processing system does not require information beforehand regarding which direction will improve the pitch, yaw or focus alignment. Instead, the image processing system identifies an error, makes a correcting move with respect to that axis, and determines if the next captured image has improved the alignment in that axis. If yes, further correction in the same direction is made; if not, corection in the opposite diretion is initiated.

Figure 5:
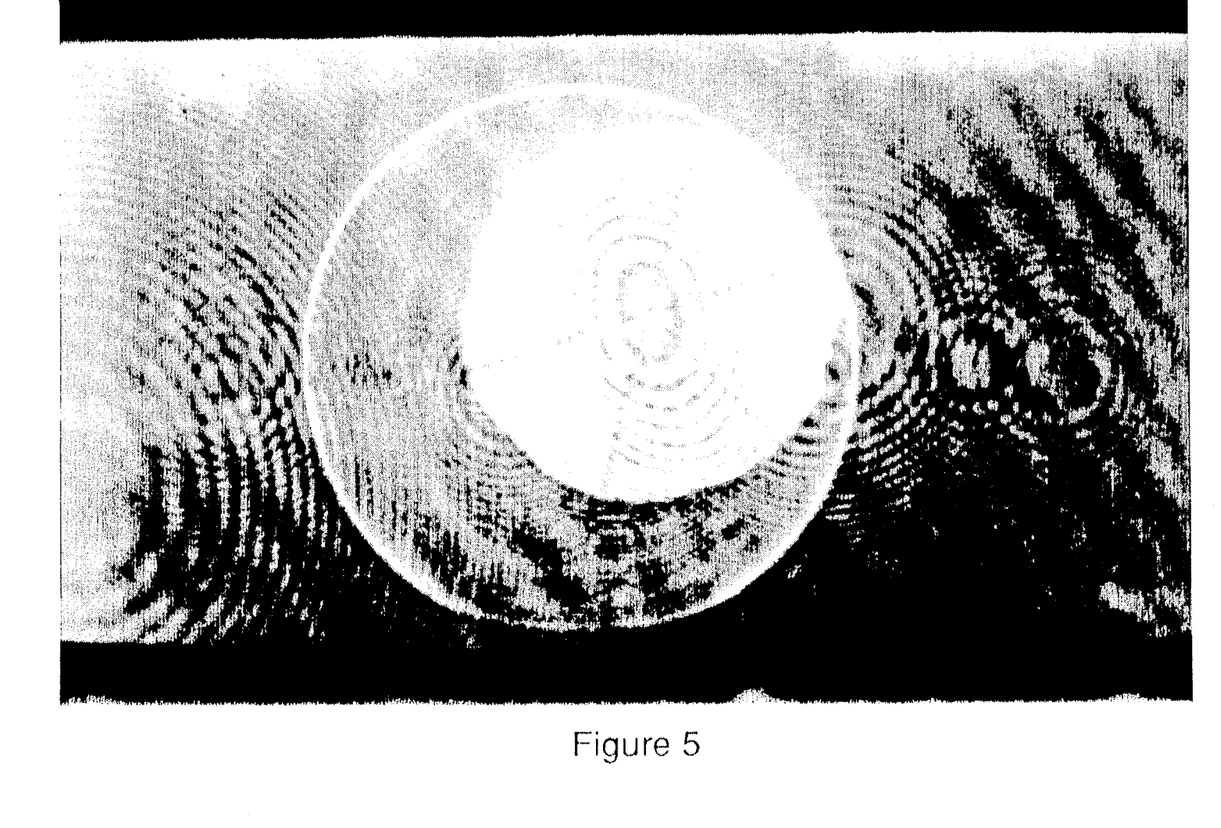
FIG. 5 is a photograph of the cube corner interferogram after correcting focus to reduce the fringe density.
Figure 14:
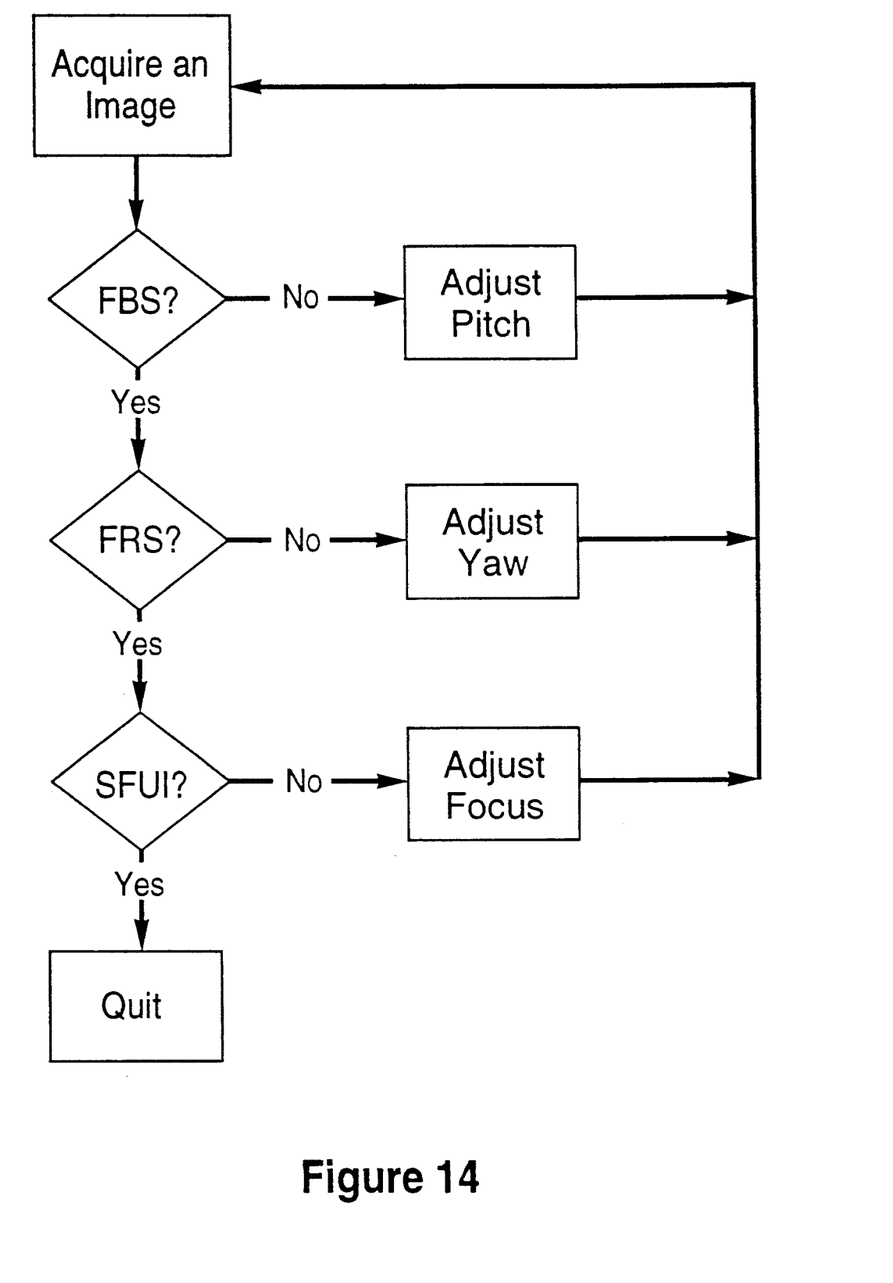
FIG. 14 is a flow diagram of the automated alignment system of FIG. 13.

Referring to FIG. 14, the operations that take place as the image is analyzed are: 1) a test (FBS?) to determine if the fringes are bilaterally symmetric about the image pitch axis (for pitch adjustment), 2) a test (FRS?) to determine if the fringes are radially symmetric (for yaw adjustment), and 3) a test (SFUI?) to determine if the intensity distribution is flat (uniform) across the image of a single fringe (for focus adjustment). FIGS. 5 and 6 are referred to for illustrative purposes. FIG. 5 is an interferogram having a large number of concentric fringes present. FIG. 6 shows similar fringes, but additionally exhibits rotational and elongational asymmetries that are easier to observe than in FIG. 5.

Referring to the flow diagram in FIG. 14, the first step is for the image processing system 22 to acquire a retroreflector image. The computer in the image processing system 22 then interprets the fringes in the image by determining the correlation in the intensity distributions on either side of the image pitch axis. The image pitch axis, not shown, passes through the center of the retroreflector image, and is parallel to the pitch axis of the optic.

FIG. 7 shows an image with a high degree of bilateral symmetry, i.e., symmetry about the image pitch axis. The computer determines the degree of symmetry from the correlation in the intensity distributions. If the image is bilaterally symmetric as in FIG. 7, there is no pitch error. If it is not bilaterally symmetric, pitch is adjusted by a command from the actuator controller 23 to the pitch actuator 24 to correct the alignment. The direction taken by the image processing system 22 to correct pitch (and also yaw and focus) was described previously.

A new image is acquired and a determination made whether the correlation is higher or lower. If the correlation is higher, it indicates that the correction has been made in the proper direction and the pitch adjustment process continues in that direction to eliminate the pitch error. If the correlation is lower, pitch adjustment corrections in the opposite direction are made until the pitch error is eliminated.

When the image is bilaterally symmetric about the pitch axis, the next determination the image processing system 22 makes in an acquired image is whether it is also radially symmetric meaning that no yaw error exists. FIG. 8 illustrates a yaw-corrected interferogram exhibiting a high degree of radial symmetry.

If the fringes are bilaterally symmetric but not radially symmetric (FIG. 7), then there is no pitch error but yaw error still exists and a yaw correction is needed. A command is sent from the actuator controller 23 to the yaw actuator 25 to correct the alignment. The computer then determines if the radial intensity distributions have been improved or worsened by the correction. If they have been improved, correction in that same direction is continued; if not, the image processing system reverses the correction direction. Correction continues until the improvement in radial intensity distributions has been maximized, meaning that the yaw errors are minimized. It will be appreciated from FIG. 14 that before making each new yaw determination, the system rechecks pitch and corrects it if needed.

The last determination is whether or not any residual focus error exists. FIG. 8 illustrates residual uncorrected focus error following pitch and yaw corrections. Looking at FIG. 8, it can be seen that the radial intensity profile will contain several maxima and minima due to the presence of multiple interference fringes. The decision the image processing system 22 makes in the SFUI? decision block is: is the radial intensity profile devoid of local extrema which exceed a specified tolerance? If not, adjust focus to decrease the number of local extrema in the radial intensity profile.

As the focus improves, the number of interference fringes in the image decreases (i.e., there will be fewer maxima and minima present). The limit on focus improvement is achieved when a single uniform fringe is present with the radial intensity distribution uniform to the extent that the extremes of the intensity distribution are within a specified tolerance. That is, the entire radial distribution is now within some specified intensity difference. At that point, the system is aligned and will quit.

While there has been shown and described what are at present considered the preferred embodiments of the invention, it will be obvious to those skilled in the art that various changes and modifications can be made therein without departing from the scope of the invention. It should be emphasized that, in addition to the alignment of autocollimating tests, the technique can be applied generally to the alignment of paraboloids in a variety of optical systems.

Although the invention has been described for paraboloids, it is applicable to the general category of aspheric optics. There are devices called wavefront correctors that are capable of modifying wavefronts so that they are no longer spherical. These may be composed of reflective, refractive, or diffractive optics. They may be designed to modify a wavefront so that when correctly aligned to a specific asphere, the result is light collimated exactly as would be obtained by reflecting light from a point source off of a paraboloid. Thus, this combination of corrector and optic is indistinguishable from the combination of a point source and paraboloid, and therefore the same methods as described herein are useful for aligning the general category of aspheric optics to specifically tailored wavefronts.

The alignment process or the fully automated system can be adapted for specific applications other than paraboloids. The alignment technique is highly sensitive to collimation errors and astigmatism and therefore could be of value to a variety of systems in which it is necessary to verify collimation or to eliminate astigmatism.

The improved alignment method thus equilibrates the alignment challenge of the two paraboloidal alignment configurations. This allows greater freedom in selecting an appropriate test configuration, and in addition, the diverging beam method is now rendered capable of automation.

Having thus described the aforementioned invention, I claim:

1. A method for aligning an off-axis paraboloidal segment to a point in space comprising the steps of:
   a. using a lens to focus a beam of light from a source to said point in space;
   b. placing said paraboloidal segment in the diverging portion of said beam so that the light reflected from said segment is approximately collimated due to the focal point of said segment being close to the focal point of said lens;
   c. placing a cube corner retroreflector in the path of said light reflected from said paraboloidal segment such that the light reflected from said retroreflector returns to said segment and is directed into an imaging system to produce an image of said retroreflector which is aberrated due to alignment errors in said paraboloidal segment;
   d. adjusting the pitch of said segment to make the aberrated image symmetrical about an axis parallel to the pitch axis of said segment;
   e. adjusting the yaw of said segment to maximize the radial symmetry of said image;
   f. adjusting the axial position of said segment to focus said image; and
   g. repeating steps e. and f. until the best image is obtained.

2. The invention of claim 1 wherein said light reflected from said retroreflector that returns to said segment reflects from said segment and is intercepted by a beam splitter which directs said light to said imaging system.

3. The invention of claim 2 wherein said imaging system is a viewing screen.

4. The invention of claim 2 wherein said imaging system is a camera.

5. The invention of claim 2 wherein said imaging system is an objective lens for direct viewing.

6. A method for aligning an off-axis paraboloidal segment to a diverging beam from an interferometer comprising the steps of:
   a. placing said paraboloidal segment in the diverging portion of said beam so that the light reflected from said segment is approximately collimated;
   b. placing a cube corner retroreflector in the path of said light reflected from said paraboloidal segment so that light reflected from said retroreflector returns to said segment then to said interferometer, producing an aberrated image of said retroreflector in the imaging system of said interferometer;
   c. adjusting the pitch of said segment to make the aberrated image symmetrical about an axis parallel to the pitch axis of said segment;
   d. adjusting the yaw of said segment to maximize the radial symmetry of said image;
   e. adjusting the axial position of said segment to focus said image;
   f. repeating steps d. and e. until the best image is obtained;
   g. adjusting the axial position of said segment to increase the size of the concentric interference fringes formed at the center of said image until the fringe pattern becomes radially asymmetric;
   h. adjusting the pitch of said segment to make said fringe pattern symmetric about an axis parallel to the pitch axis;
   i. adjusting the yaw of said segment to maximize the radial symmetry in said fringe pattern; and
   j. repeating steps g, h, and i until the image is a single uniform fringe symmetric about the pitch axis and of uniform average intensity.

7. A method for automatically aligning an off-axis paraboloidal segment to a diverging beam from an interferometer wherein a paraboloidal mirror segment is located in the diverging portion of said beam so that the light reflected from said segment is approximately collimated, and wherein a cube corner retroreflector is located in the path of said light reflected from said paraboloidal segment so that light reflected from said retroreflector returns to said segment then to said interferometer and produces an image of said retroreflector in the imaging system of said interferometer, said image being radially symmetric and in focus with interference fringes present at least at the center of said image, and wherein means are present to correct pitch, yaw, and focus of said segment, the steps of:
   a. acquiring an image of said retroreflector;
   b. determining the correlation in the intensity distributions on either side of the image pitch axis;
   c. making a pitch correction;
   d. repeating steps a. through c. until said intensity distributions on either side of said image pitch axis are bilaterally symmetric;
   e. determining the correlation in intensity distribution profiles along several radii of said image;
   f. making a yaw correction;
   g. repeating steps a. through d. until the correlation of said intensity distributions along several radii of said image are maximized;
   h. determining the number of local maxima and minima in one radial intensity profile;
   i. making a focus correction; and
   j. repeating steps a. through i. until only a single maxima and minima remain in said profile, and are within a specified tolerance.

* * * * *